United States Patent
Seki

(10) Patent No.: US 11,372,883 B2
(45) Date of Patent: Jun. 28, 2022

(54) APPARATUS FOR CALCULATING SIZE OF PROCESSING UNIT, METHOD FOR CALCULATING SIZE OF PROCESSING UNIT, AND NON-TRANSITORY COMPUTER-READABLE STORAGE MEDIUM FOR STORING PROGRAM

(71) Applicant: FUJITSU LIMITED, Kawasaki (JP)

(72) Inventor: Eiji Seki, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 584 days.

(21) Appl. No.: 16/374,253

(22) Filed: Apr. 3, 2019

(65) Prior Publication Data

US 2019/0228018 A1    Jul. 25, 2019

Related U.S. Application Data

(63) Continuation of application No. PCT/JP2016/080282, filed on Oct. 12, 2016.

(51) Int. Cl.
*H04L 12/00* (2006.01)
*G06F 16/25* (2019.01)
(Continued)

(52) U.S. Cl.
CPC ......... *G06F 16/258* (2019.01); *G06F 9/5016* (2013.01); *G06F 11/3037* (2013.01);
(Continued)

(58) Field of Classification Search
CPC .. G06F 16/221; G06F 9/5016; G06F 11/3037; G06F 16/2329; G06F 16/258; G06F 16/254; G06F 12/00; G06F 11/3452
(Continued)

(56) References Cited

U.S. PATENT DOCUMENTS 10,740,355 B2 *  8/2020  Horowitz .............. G06F 16/278
10,846,305 B2 * 11/2020  Merriman ............. G06F 16/278
(Continued)

FOREIGN PATENT DOCUMENTS

JP    2001-75844     3/2001
JP    2001-175513    6/2001
(Continued)

OTHER PUBLICATIONS

International Search Report attached with the Written Opinion of the International Searching Authority, mailed in connection with PCT/JP2016/080282 and dated Dec. 27, 2016, with partial English translation (8 pages).
(Continued)

*Primary Examiner* — Frantz Coby
(74) *Attorney, Agent, or Firm* — Fujitsu Patent Center

(57) ABSTRACT

A method for calculating a size of a processing unit in a system, the system being configured to perform a reflection process that includes reflecting information on an operation performed in a row-type database on a column-type database in a predetermined processing unit, the method includes: executing a first calculation process for calculating a reference value based on processing costs of multi-version concurrency control performed in the processing unit by the database management system and information on processing costs of a process of converting the information on the operation performed in the row-type database into a form of the column-type database after the reflection process is executed in a previous time; and executing a second calculation process for calculating a size of a processing unit based on the reference value calculated by the first calculation process and information on a deviation of the number of valid rows.

12 Claims, 12 Drawing Sheets

(51) Int. Cl.
*G06F 16/22* (2019.01)
*G06F 9/50* (2006.01)
*G06F 11/30* (2006.01)
*G06F 11/34* (2006.01)
*G06F 12/00* (2006.01)
*G06F 16/23* (2019.01)

(52) U.S. Cl.
CPC .......... *G06F 11/3452* (2013.01); *G06F 12/00* (2013.01); *G06F 16/221* (2019.01); *G06F 16/2329* (2019.01); *G06F 16/254* (2019.01)

(58) Field of Classification Search
USPC ................................. 707/714, 765, 803, 602
See application file for complete search history.

(56) References Cited

U.S. PATENT DOCUMENTS

| | | | |
|---|---|---|---|
| 2005/0256897 A1* | 11/2005 | Sinha | G06F 16/24552 |
| 2006/0069885 A1 | 3/2006 | Matsui et al. | |
| 2015/0006466 A1* | 1/2015 | Tonder | G06F 16/2336 |
| | | | 707/602 |
| 2016/0078079 A1* | 3/2016 | Hu | G06F 16/20 |
| | | | 707/803 |
| 2016/0078085 A1* | 3/2016 | Hu | G06F 16/254 |
| | | | 707/765 |
| 2016/0078089 A1* | 3/2016 | Hu | G06F 16/2379 |
| | | | 707/714 |

FOREIGN PATENT DOCUMENTS

| | | |
|---|---|---|
| JP | 2002-318717 | 10/2002 |
| JP | 2003-223350 | 8/2003 |
| JP | 2005-234945 | 9/2005 |
| JP | 2006-106868 | 4/2006 |

OTHER PUBLICATIONS

Nminoru et al., "Implementation of column store mechanism based on PostgreSQL", DEIM Forum 2015 E4-2, Mar. 4, 2015 with Translation of Summary Internet URL <http://db-event.jpn.org/deim2015/paper/195.pdf> (Cited in ISR), with partial English translation (7 pages).

Hashida Takushi et al., "Concurrency control technique for OLXP system based on PostgreSQL", Information Processing Society of Japan, WebDB Forum 2015, pp. 64-71, Nov. 17, 2015 (Cited in ISR), with English Abstract (8 pages).

Nminoru et al., "Implementation of col. store mechanism based on PostgreSQL", DEIM Forum 2015 E4-2, Mar. 4, 2015 with Translation of Summary Internet URL <http://db-event.jpn.org/deim2015/paper/195.pdf> (Cited in ISR), with partial English translation (7 pages).

* cited by examiner

FIG. 7

```
M ← NUMBER OF EXTENTS
for i from 1 to M do
    size[i] ← SIZE OF Iᵀᴴ EXTENT
done
PERFORM SORTING SUCH THAT ARRAY SIZE [] IS IN ORDER OF
"SMALL" TO "LARGE"          ...(1)

ave_size ← AVERAGE OF VALUE OF ARRAY SIZE []
rest_del ← TOTAL NUMBER OF DELETED ROWS (CALCULATE FROM
ARRAY DEL [] OF FLOWCHART)
sum ← 0 for i from 1 to M do
    rest_size ← size[i]
    if rest_del > 0 then
        del_num ← Min(size[i], rest_del)      ...(2)
        rest_size ← rest_size - del_num
        rest_del ← rest_del - del_num         ...(3)
    end
    sum ← sum + (rest_size - ave_size)^2      ...(4)
done
return sum / M                                ...(5)
```

FIG. 10

|  | OLTP (UPDATING PROCESS, SEARCHING FOR SMALL AMOUNT OF DATA) | OLAP (COLLECT LARGE AMOUNT OF DATA) |
|---|---|---|
| ROW TYPE | ○ FAST | × SLOW |
| COLUMN TYPE (COLUMN) | × SLOW | ○ FAST |

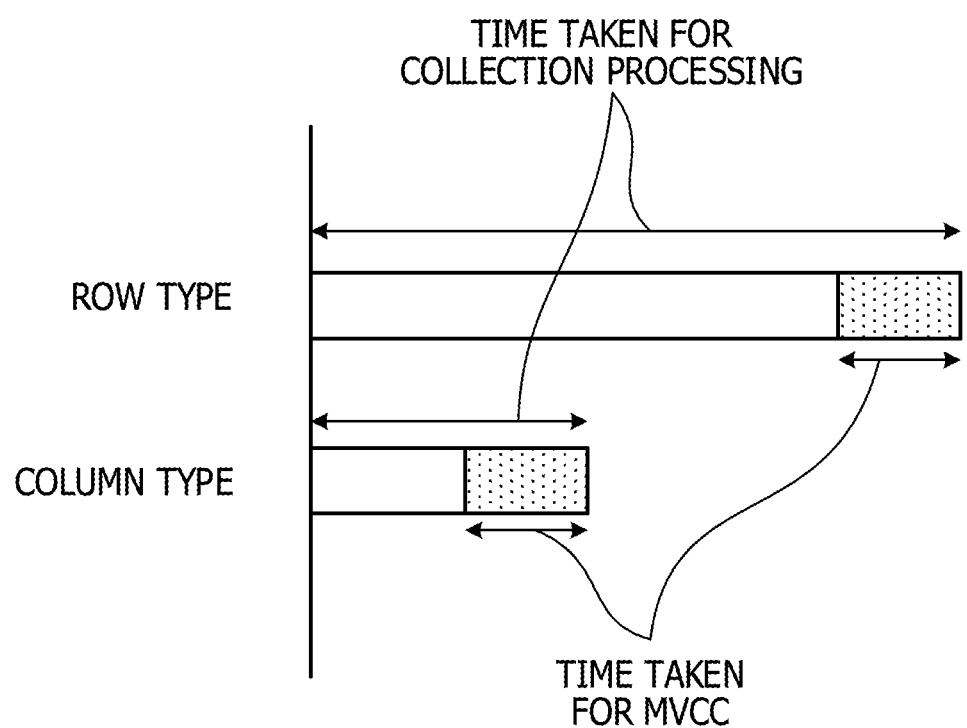

APPARATUS FOR CALCULATING SIZE OF PROCESSING UNIT, METHOD FOR CALCULATING SIZE OF PROCESSING UNIT, AND NON-TRANSITORY COMPUTER-READABLE STORAGE MEDIUM FOR STORING PROGRAM

CROSS-REFERENCE TO RELATED APPLICATION

This application is a continuation application of International Application PCT/JP2016/080282 filed on Oct. 12, 2016 and designated the U.S., the entire contents of which are incorporated herein by reference.

FIELD

An embodiment discussed herein relates to an apparatus for calculating the size of a processing unit, a method for calculating the size of a processing unit, and a non-transitory computer-readable storage medium for storing a program.

BACKGROUND

A relational database management system (RDBMS) performs two processes including online transaction processing (OLTP) and online analytical processing (OLAP). The OLTP is a process of inserting, updating, and deleting data, and the OLAP is a process of performing statistical processing and the like on already accumulated data.

FIG. 10 is a table for illustrating the features of the OLTP and the OLAP. In FIG. 10, a row type indicates a row-type database that collectively stores data contained in one row, and a column type indicates a column-type database which collectively stores data included in one column.

As illustrated in FIG. 10, in the OLTP, although updating processing is generated, a small number of data is discovered as compared to the OLAP. Therefore, in the OLTP, the processing is performed faster when the row type is used than when the column type is used. Meanwhile, in the OLAP, as a specific column is collected, a large amount of data is collected. However, in the OLAP, the processing is performed faster when the column type is used than when the row type is used. Therefore, an operation of inserting, updating, and deleting data is performed on the row-type database, and the data of the row-type database is shifted to the column-type database asynchronously, for example, daily, weekly, or the like.

In recent years, it is required to utilize the latest collection data for business. For example, based on a sales situation in the morning, an afternoon delivery plan will be formulated. Therefore, the demand of a database management system including advantages of both the row-type database and the column-type database is increasing.

A technology is disclosed in which a page stored in a data region is updated using an empty page acquired from a shadow region and the data region is updated using a list of an effective page on the shadow region at each commit time, so that fragmentation of data is suppressed.

Further, a technology is disclosed in which even when a plurality of transactions are updated to the latest version between start and end of a backup, the database management system guarantees consistency of a database to be backed up, so that the backup may be performed in a simple work process.

Further, a technology is disclosed in which the maximum value of the size of a next-allocated extent in each segment arranged in each table area of the database and a space capacity of a continuous unused area of each table area are compared with each other, so that an insufficient storage capacity of a difference between new allocated extents is detected in advance.

Further, a technology is disclosed in which a data format is set as a node, a conversion method is set as a branch, a weighted directed graph having a cost taken for data conversion as a weight is stored, and an optimum data conversion combination is acquired by solving a shortest path problem of the directed graph in data conversion combination.

Examples of the related art include Japanese Laid-open Patent Publication No. 2006-106868 is an example of the related art, Japanese Laid-open Patent Publication No. 2002-318717 is an example of the related art, Japanese Laid-open Patent Publication No. 2001-175513 is an example of the related art, and Japanese Laid-open Patent Publication No. 2001-75844 is an example of the related art.

SUMMARY

According to an aspect of the embodiments, an apparatus for calculating a size of a processing unit in a database management system includes a memory and a processor coupled to the memory. The database management system is configured to perform a reflection process that includes reflecting information on an operation performed in a row-type database on a column-type database in a predetermined processing unit. The processor of the apparatus is configured to: execute a first calculation process that includes calculating a processing unit reference value based on first information and second information, the first information indicating processing costs of multi-version concurrency control performed in the processing unit by the database management system, the second information indicating processing costs of a process of converting the information on the operation performed in the row-type database into a form of the column-type database after the reflection process is executed in a previous time; and execute a second calculation process that includes calculating a size of a processing unit based on the processing unit reference value calculated by the first calculation process and information on a deviation of the number of valid rows included in the plurality of processing units.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an algorithm for calculating $\sigma_{max}$;

FIG. 10 is a table for illustrating the features of an OLTP and an OLAP; and FIG. 11 is a diagram for illustrating a problem of multi-version concurrency control (MVCC) in row units.

DESCRIPTION OF EMBODIMENTS

In an OLAP that synchronously uses updated data by an OLTP, MVCC is required to coexist with OLTP transaction. Here, the MVCC is a technology that uses multiple versions of database to maintain data integrity in a multi-user environment. In concurrency control, a lock mechanism is used. However, as compared to the lock mechanism, the MVCC has an advantage in that acquisition of read lock and acquisition of write lock do not conflict.

However, a row-unit MVCC according to the related art has a problem in that overhead may not be ignored. FIG. 11 is a diagram for illustrating a problem of MVCC in row units. As illustrated in FIG. 11, a time required for collection processing is shorter in a column-type database than in a row-type database. Therefore, in the column-type database, overhead of the MVCC may not be ignored.

According to an aspect of the embodiment, an object is to lower execution costs of the MVCC.

Hereinafter, an embodiment of a program for calculating the size of a processing unit, a method of calculating the size of a processing unit, and an apparatus for calculating the size of a processing unit, disclosed in the application, will be described in detail with reference to the drawings. This embodiment does not limit the disclosed technology.

Embodiment

Figure 1:
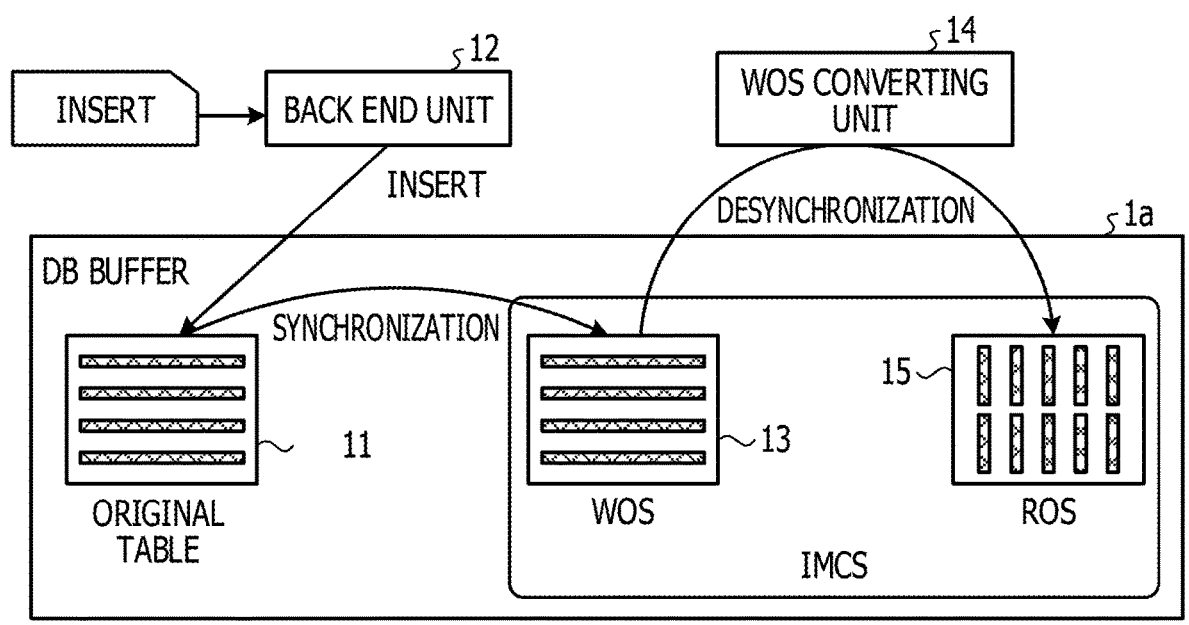
FIG. 1 is a diagram for illustrating an IMCS on which an update is synchronously reflected by an OLTP query.

First, an in-memory column store (IMCS) will be described. FIG. 1 is a diagram for illustrating an IMCS on which an update is synchronously reflected by an OLTP query. As illustrated in FIG. 1, in the IMCS, a DB buffer 1*a* has a read optimized storage (ROS) 15 having a column-type data structure. The DB buffer 1*a* is a region on a main memory that stores an original table 11 which is a row-type database. Further, in order to maintain update performance, the DB buffer 1*a* has a write optimized storage (WOS) 13 having a row-type data structure as a write buffer.

When insertion (INSERT) of data into a database is instructed, a back end unit 12 inserts the data into the original table 11. Here, the back end unit 12 is a module that processes an operation (insertion, update, and deletion) of the database. Further, the WOS 13 is written in synchronization with the insertion of the data into the original table 11. However, not data but only a tuple-ID (TID) indicating a position of a row (a tuple) in the original table 11 is written in the WOS 13.

As asynchronous processing, the WOS 13 is converted into the ROS 15 in a unit called an extent by a WOS converting unit 14. At this time, the data is drawn out from the original table 11 based on the TID stored in the WOS 13 and is written in the ROS 15 for each extent, and a row written in the ROS 15 is removed from the WOS 13.

Figure 2:
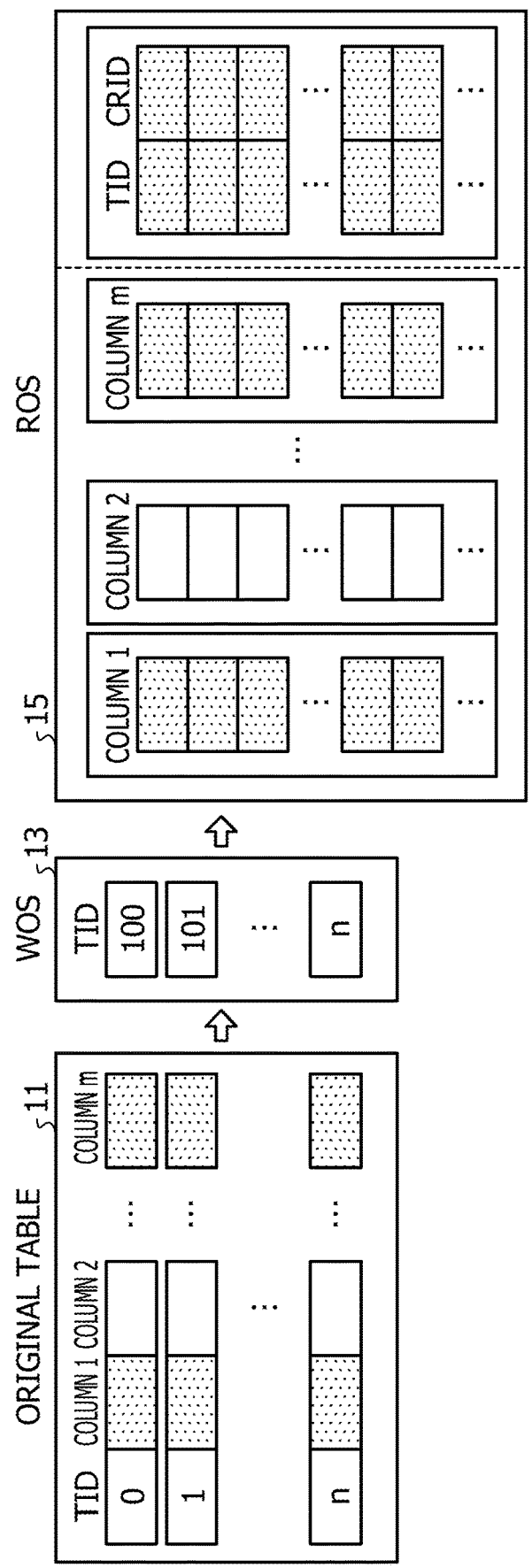
FIG. 2 is a diagram for illustrating copying of data from the original table to the IMCS.

FIG. 2 is a diagram for illustrating copying of data from the original table 11 to the IMCS. As illustrated in FIG. 2, in the original table 11, the TID is allocated to each row. The WOS 13 stores a difference between the original table 11 and the ROS 15 using the TID. Further, the ROS 15 stores data for each extent. The ROS 15 also stores a correspondence table between a columnar record ID (CRID) indicating a row number in the ROS 15 and the TID.

Figure 3:
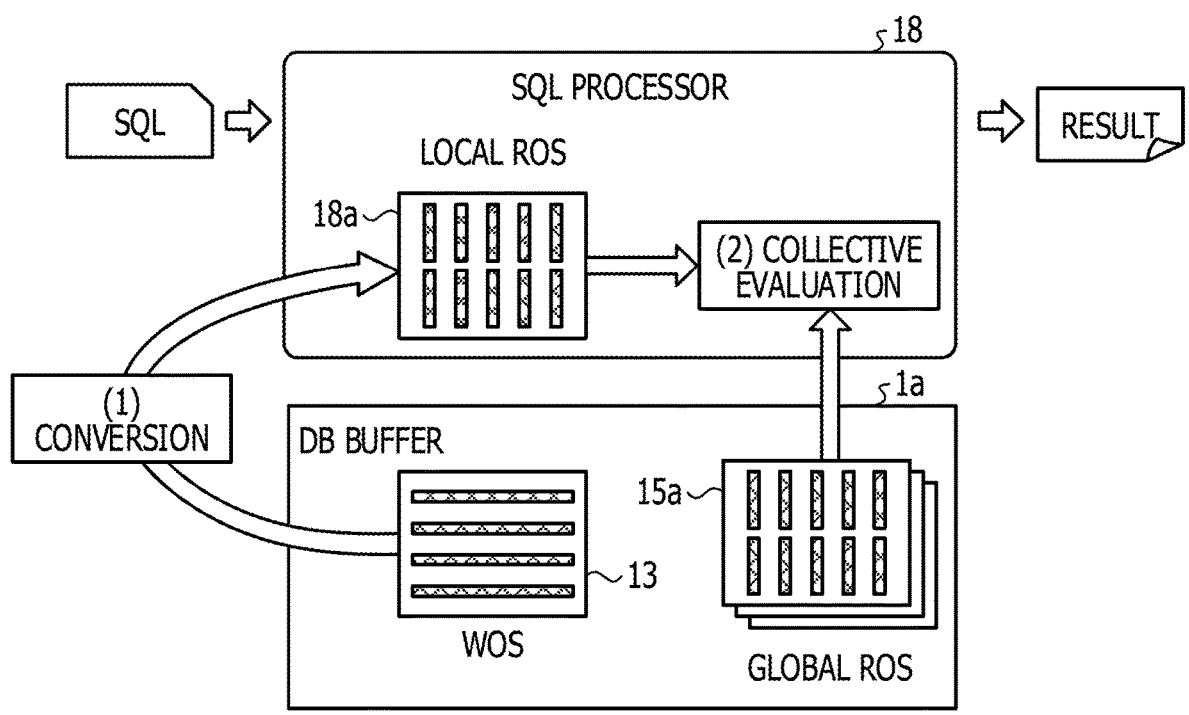
FIG. 3 is a diagram for illustrating a local ROS.

During searching, the WOS 13 is temporarily converted into column-type data, and is discovered together with the ROS 15. The temporarily converted column-type data is called a local ROS. FIG. 3 is a diagram for illustrating a local ROS. In FIG. 3, a SQL processor 18 is a module that searches a database by processing a SQL.

As illustrated in FIG. 3, when receiving the SQL, the SQL processor 18 converts the WOS 13 to create a local ROS 18*a*. Thus, the SQL processor 18 searches for a global ROS 15*a* and the local ROS 18*a* together, and outputs a result of the search. Here, the global ROS 15*a* is a ROS 15 converted from the WOS 13.

Figure 4:
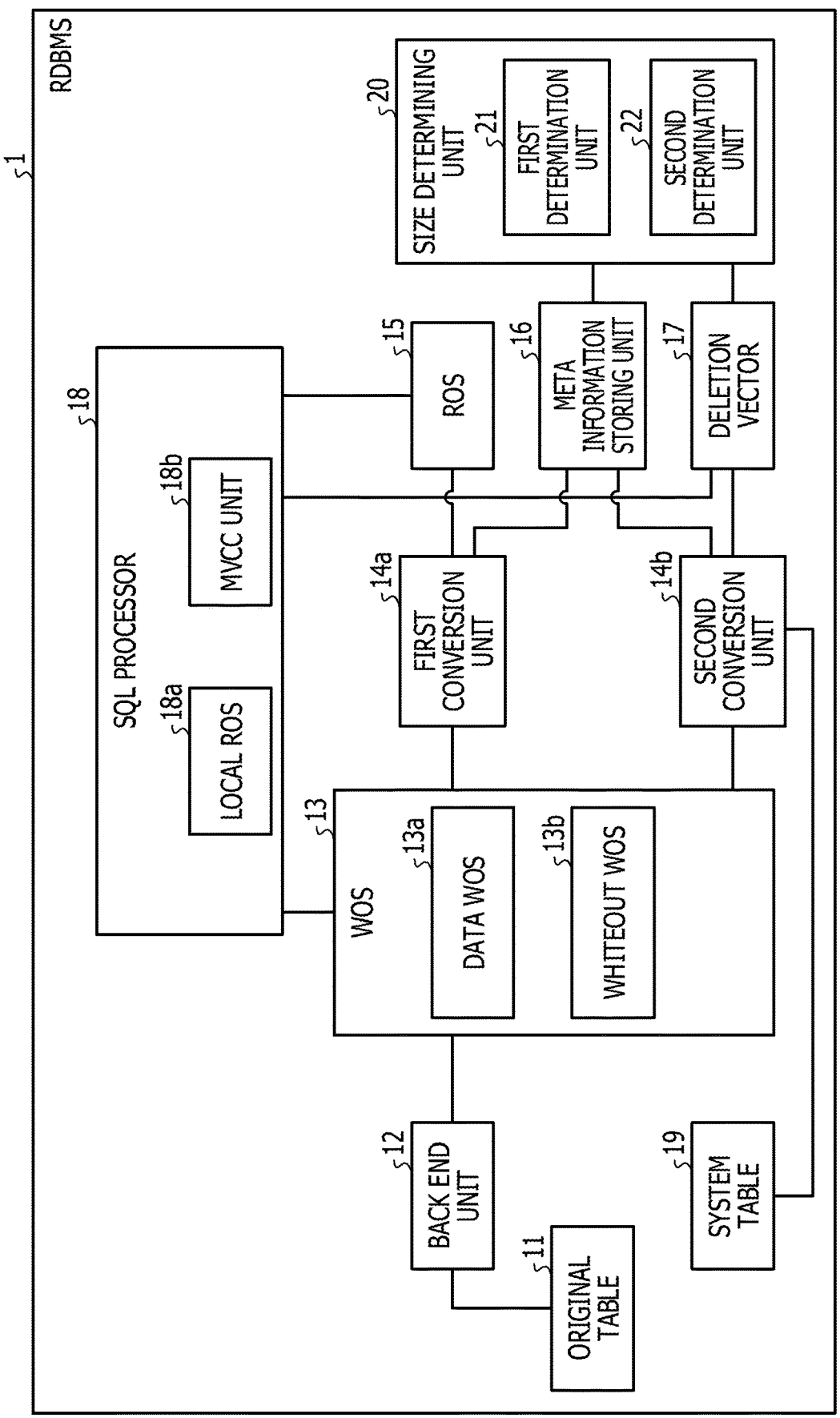
FIG. 4 is a block diagram illustrating a functional configuration of an RDBMS according to an embodiment.

Next, a functional configuration of an RDBMS according to the embodiment will be described. FIG. 4 is a block diagram illustrating a functional configuration of an RDBMS according to the embodiment. As illustrated in FIG. 4, an RDBMS 1 according to the embodiment includes the original table 11, the back end unit 12, the WOS 13, a first conversion unit 14*a*, a second conversion unit 14*b*, the ROS 15, a meta information storing unit 16, a deletion vector 17, and the SQL processor 18. Further, the RDBMS 1 includes a system table 19 and a size determining unit 20.

The original table 11 is a row-type database. The original table 11 includes a plurality of tables. The back end unit 12 inserts data into the original table 11, and updates and deletes the data of the original table 11. Further, the back end unit 12 updates the WOS 13 in synchronization of operation of the original table 11.

The WOS 13 stores the difference between the original table 11 and the ROS 15 using the TID. The WOS 13 includes a data WOS 13*a* and a whiteout WOS 13*b*. The data WOS 13*a* stores a TID of an inserted row. Further, the data WOS 13*a* stores a TID of a row newly created as a row after update, with respect to an updated row. The whiteout WOS 13*b* stores a TID of a deleted row. Further, the whiteout WOS 13*b* stores a TID of a deleted row before update, with respect to the updated row.

When the size of the data WOS 13*a* reaches the size of the extent, the first conversion unit 14*a* converts the data WOS 13*a* to update the ROS 15 and the meta information storing unit 16. The size of the extent, which is variable, is determined by the size determining unit 20 after the processing by the first conversion unit 14*a* is terminated. The determined size is written in the meta information storing unit 16, and is used next when the first conversion unit 14*a* performs the processing. Further, the first conversion unit 14*a* converts only visible data from all existing transactions. Here, "visible" means a not committed state. The WOS converting unit 14 illustrated in FIG. 1 corresponds to the first conversion unit 14*a*. Further, the first conversion unit 14*a* allocates a transaction ID to the created extent.

The second conversion unit 14*b* converts the whiteout WOS 13*b* to update the deletion vector 17 and the meta information storing unit 16.

The ROS 15 is a database obtained by converting the data of the original table 11 into column-type data. The ROS 15 is a set of extents. Column collection processing, and the like are performed using the ROS 15.

The meta information storing unit 16 stores meta information on the IMCS. The meta information storing unit 16 stores, for example, the size of each extent, a transaction ID of each extent, and the size determined by the size determining unit 20.

The deletion vector 17 is a bit vector indicating a position of deleted data. One deletion vector 17 corresponds to one extent.

The SQL processor 18 processes the SQL to search the database. When receiving the SQL, the SQL processor 18 converts the WOS 13 to create the local ROS 18*a*. Further, the SQL processor 18 has an MVCC unit 18*b*.

The MVCC unit 18*b* performs the MVCC. The MVCC unit 18*b* collectively performs the MVCC in extent units. The MVCC unit 18*b* performs MVCC control by comparing the transaction ID allocated to the extent by the first conversion unit 14*a* with the transaction ID of the SQL processor 18 with each other.

The first conversion unit 14*a* converts only visible data from all existing transactions, to complete a part of MVCC processing. Further, the MVCC unit 18*b* minimizes the MVCC inside the extent by skipping a row deleted only by a bit operation using the deletion vector 17.

The system table 19 stores information on the RDBMS 1. The system table 19 stores, for example, the number of rows in each table.

The size determining unit 20 determines the size of the extent. The size determining unit 20 determines the size of the extent in two stages. In a first stage, the size determining unit 20 determines the best size of the extent when it is assumed that only the insertion process corresponding to the total number of data is performed. In a second stage, the size determining unit 20 corrects the size of the extent determined in the first stage, based on influence of the updating process. The size determining unit 20 includes a first determination unit 21 that performs the processing of the first stage and a second determination unit 22 that performs the processing of the second stage. The first determination unit 21 corresponds to a first calculation unit according to the appended claims, and the second determination unit 22 corresponds to a second calculation unit according to the appended claims.

The first determination unit 21 determines the size of the extent based on costs related to the size of the extent. The costs related to the size of the extent include costs of the MVCC and costs for the conversion into the local ROS 18*a*.

The costs of the MVCC occur once for each extent, and are calculated by Equation (1).

$$MVCCC \frac{N}{EX} \quad (1)$$

Here, an MVCCC is the costs of the MVCC for one time, and is a time. The MVCCC is a constant based on actual measurement. N is the number of rows of entire data. EX is the size of the extent. As the size of the extent becomes larger, the costs of the MVCC become smaller.

Since the average size of the WOS 13 is equal to EX/2, the costs for conversion into the local ROS 18*a* are calculated by Equation (2).

$$LROS \frac{EX}{2} \quad (2)$$

Here, the LROS is costs per row for conversion into the local ROS 18*a*, and is a time. The LROS is a constant based on actual measurement. As the EX becomes larger, the costs for conversion into the local ROS 18*a* become larger.

The costs Cost of the MVCC are calculated from the costs of the MVCC and the costs for conversion into the local ROS 18*a* by Equation (3).

$$\text{Cost} = MVCCC \frac{N}{EX} + LROS \frac{EX}{2} \quad (3)$$

Further, a differential Cost' of the costs Cost is expressed by Equation (4).

$$\text{Cost}' = \frac{dCost}{dEX} = -MVCCC \frac{N}{EX^2} + LROS \frac{1}{2} \quad (4)$$

Since the costs Cost is a constant value, Cost'=0 is satisfied, and the EX at which the costs of the MVCC are minimized is calculated by Equation (5). In Equation (5), C is a constant.

$$EX = \sqrt{\frac{2MVCCC}{LROS}N} = C\sqrt{N} \quad (5)$$

The second determination unit 22 corrects the size of the extent determined by the first determination unit 21, based on the influence of the updating process. When the updating is performed, even though the total number of data is the same, deletion and addition of a row by the updating is performed. Thus, the amount of data required by the MVCC increases by invalid data (an empty row). How to increase the amount of data depends on a deviation of the updating.

As a worst case, when the updating is performed to average the extent, one extent is aligned in effective data, and the number of real data is N×EX. In this case, in Equation (3), since N is N×EX, the costs Cost become smaller as EX becomes smaller. Thus, EX=1 is satisfied.

Figure 5A:
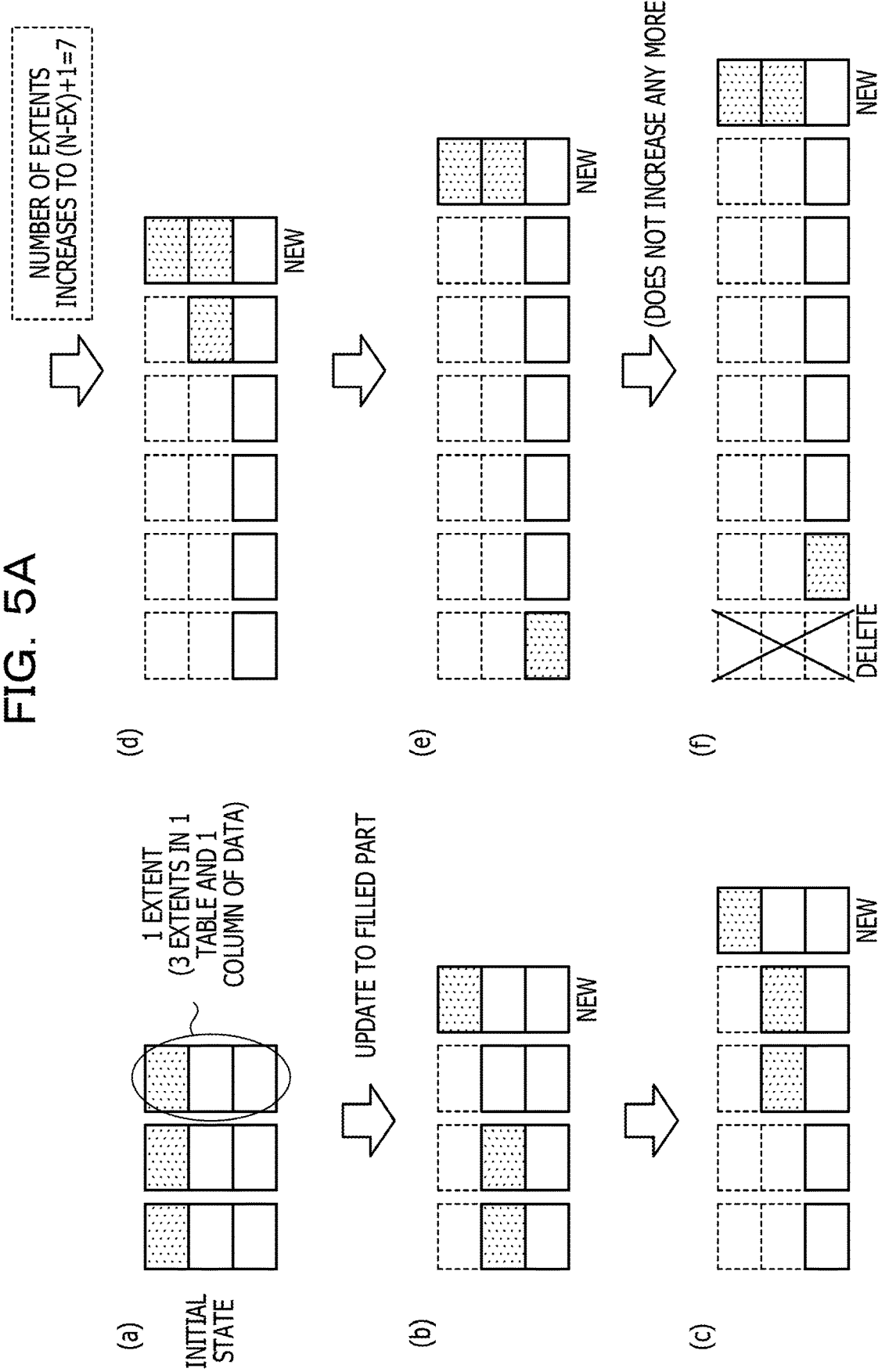
FIG. 5A is a diagram illustrating an example where an update is performed to average an extent.

FIG. 5A is a diagram illustrating an example where an update is performed to average an extent. FIG. 5A illustrates a case where EX=3 and N=9. FIG. 5A(*a*) illustrates a case where the update is performed from an initial state to a filled part, for example, a case where the update is performed to average three extents.

When the update is performed in the filled part, the filled part becomes an empty row. In FIG. 5A(*b*), the empty row is indicated by a dotted line. Further, in FIG. 5A(*b*), a new extent is created based on three pieces of the updated data. Thus, when the update is performed in the filled part of FIG. 5A(*b*), as illustrated in FIG. 5A(*c*), the filled part becomes an empty row, and a new extent is created based on three pieces of the updated data.

Thus, when the update is performed in the filled part of FIG. 5A(*c*), as illustrated in FIG. 5A(*d*), the filled part becomes an empty row, and a new extent is created based on three pieces of the updated data. Similarly, when the update is performed in the filled part of FIG. 5A(*d*), as illustrated in FIG. 5A(*e*), the filled part becomes an empty row, and a new extent is created based on three pieces of the updated data.

Thus, when the update is performed in the filled part of FIG. 5A(*e*), as illustrated in FIG. 5A(*f*), a left end of the extent has no valid row, and thus is deleted. Therefore, the number of extents does not increase. For example, the number of the extents increases to (N-EX)+1=7.

Meanwhile, as the best case, when the data of the same extent is updated until there is no more data, the number of real data is N, and the best size of the extent is a value obtained by Equation (5).

Figure 5B:
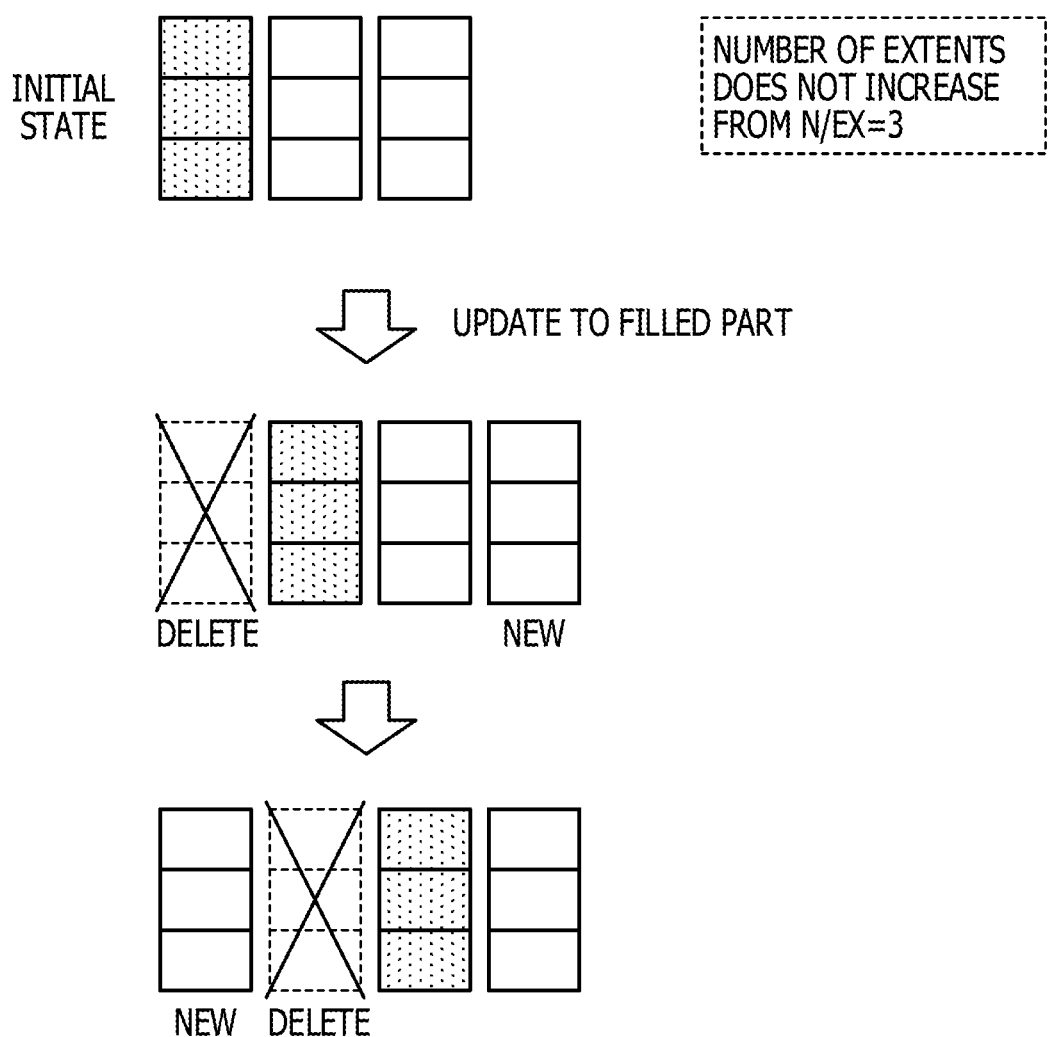
FIG. 5B is a diagram illustrating an example where data having the same extent is updated until there is no more data.

FIG. 5B is a diagram illustrating an example where data having the same extent is updated until there is no more data. As illustrated in FIG. 5B, when the update is performed in the filled part, a new extent is generated, and an extent in which all the data is updated is deleted. Thus, the number of extents does not increase.

Figure 6:
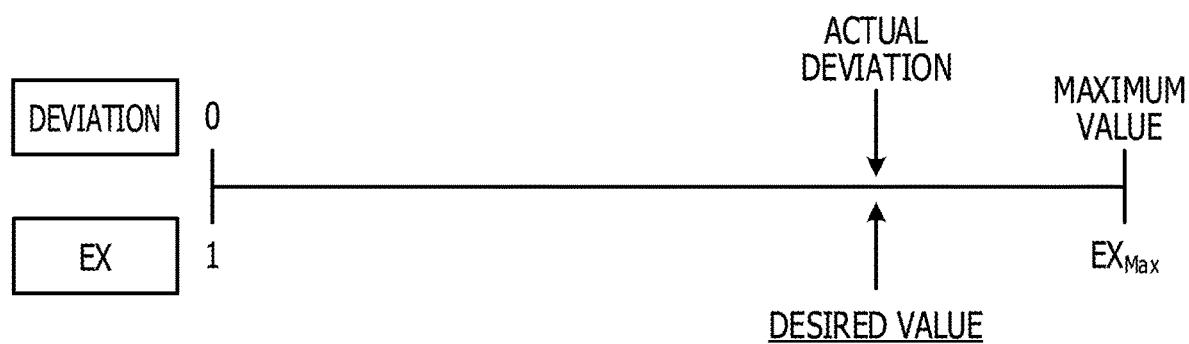
FIG. 6 is a diagram illustrating correspondence between deviation and an EX.

The second determination unit 22 associates a case where EX=1 (the worst case) with a case where a deviation is 0, and associates a case where EX is the maximum (the best case) with a case where the deviation is the maximum value. FIG. 6 is a diagram illustrating correspondence between deviation and an EX. In FIG. 6, $EX_{Max}$ indicates the maximum value of EX, and is a value when there is no updating, which is indicated by Equation (5). The second determination unit 22 calculates actual deviation and the maximum value of the deviation, and determines EX by multiplying (the actual deviation)/(the maximum value of the deviation) by the $EX_{max}$.

For example, the second determination unit 22 calculates the number of deleted rows of each extent using the deletion vector 17, and calculates the number of valid rows of each extent based on the number of rows of the extent and the number of the deleted rows. Thus, the second determination unit 22 calculates a deviation σ of the number of the valid rows and the maximum value $\sigma_{max}$ of the deviation of the number of the valid rows, and calculates EX.

The deviation σ of the number of valid rows is calculated by Equation (6).

$$REST_{AV} = \frac{1}{M}\sum_{m=1}^{M}(EX[m] - DEL[m]) \quad (6)$$

$$\sigma = \frac{1}{M}\sum_{m=1}^{M}((EX[m] - DEL[m]) - REST_{AV})^2$$

Here, EX[m] (1≤m≤M) is the size of each extent, M is the number of extents, DEL[m] is the number of the deleted rows of each extent, EX[M]-DEL[m] is the number of valid rows of each extent, and $REST_{AV}$ is an average value of the number of valid rows.

Further, $\sigma_{max}$ is calculated as a deviation of the number of valid rows when the deleted rows are filled in order from the small extent. FIG. 7 is a diagram illustrating an algorithm for calculating $\sigma_{max}$. As illustrated in FIG. 7, the second determination unit 22 inserts the size of the extent into an array size [ ] in an ascending order (1).

Thus, the size determining unit 20 stores the number of rows deleted from size[i] such that del_num does not exceed rest_del (2), and draws the number del_num of rows deleted from size[i] from the total number rest_del of deleted rows in an order from a case where i=1 (3). Further, the second determination unit 22 collects a deviation of the number of the valid rows to sum in an order from a case where i=1 (4). Thus, when deviations of M all extents are completely collected, the second determination unit 22 sets sum/M to $\sigma_{max}$(5).

Figure 8:
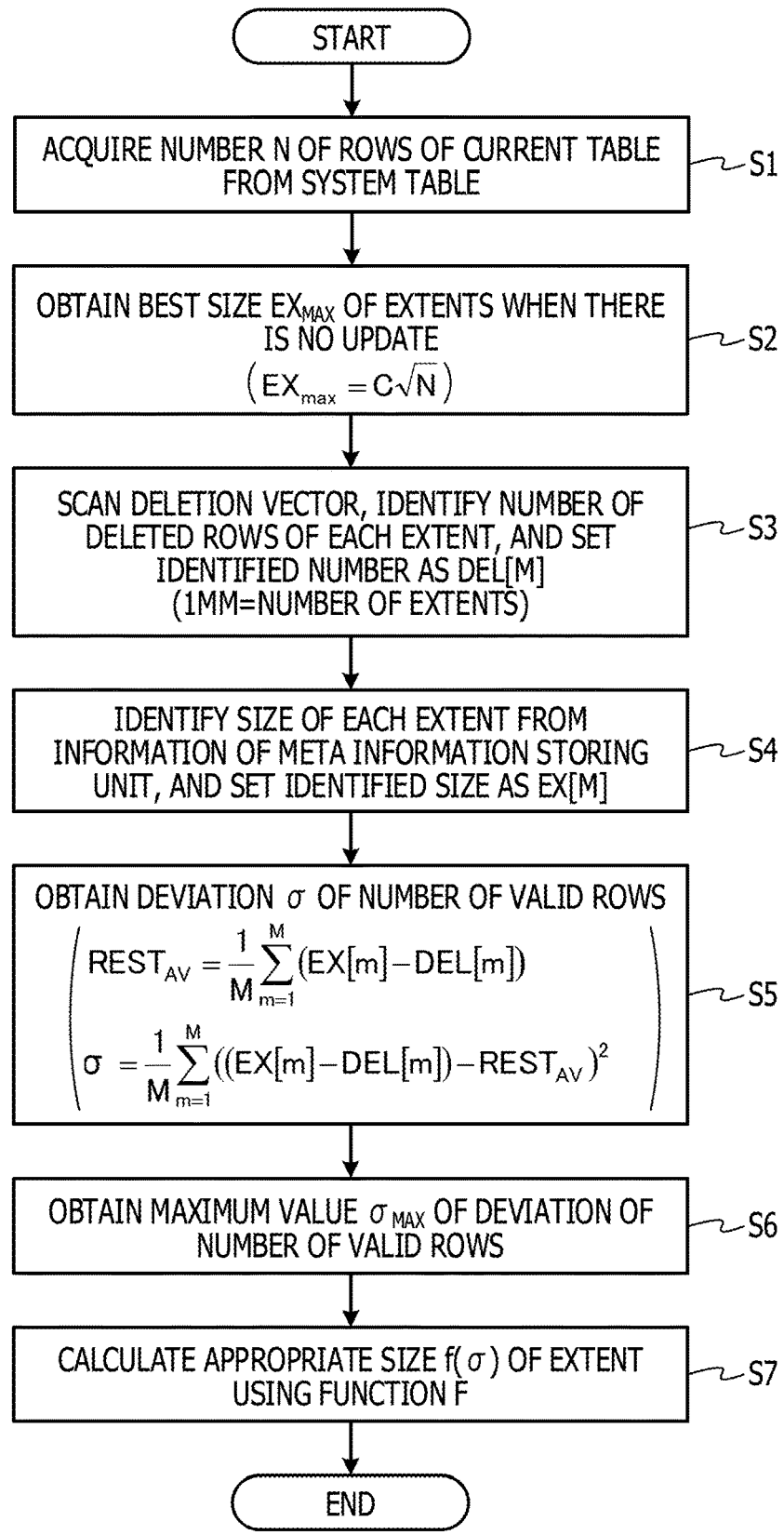
FIG. 8 is a flowchart illustrating a processing procedure of a size determining process.

Next, a processing procedure of a size determining process will be described. FIG. 8 is a flowchart illustrating the processing procedure of the size determining process. As illustrated in FIG. 8, the size determining unit 20 acquires the number of rows of a current table from the system table 19 (step S1), and obtains the best size $EX_{max}$ of the extents when there is no update (step S2).

Thus, the size determining unit 20 scans the deletion vector 17, identifies the number of deleted rows for each extent, and sets the identified number as DEL[m] (step S3). Thus, the size determining unit 20 identifies the size of each extent based on information of the meta information storing unit 16, and sets the identified size as EX[m] (step S4). An order of step S3 and step S4 may be reversed.

Thus, the size determining unit 20 acquires the deviation σ of the number of the valid rows (step S5), and acquires the maximum value $\sigma_{max}$ of the deviation of the number of the valid rows (step S6). An order of step S5 and step S6 may be reversed.

Thus, the size determining unit 20 calculates the appropriate size f(σ) of the extent using a function f (step S7). Here, the function f is a function satisfying $1 \leq f(x) \leq EX_{max}$ if $0 \leq x \leq \sigma_{max}$ and $f(x_1) \leq f(x_2)$ if $x_1 \leq x_2$. For example, the function f is defined by Equation (7). $EX_{min}$ is a user-defined constant value, which is an appropriate lower limit value of the size of the extent.

$$g(x) = 1 + \frac{x}{\sigma_{max}}(EX_{max} - 1) \quad (7)$$

$$f(x) = \text{Max}(EX_{min}, g(x))$$

In this way, the size determining unit 20 may determine the size of the extent using the deviation σ of the number of the valid rows, the maximum value $\sigma_{max}$ of the deviation σ of the number of the valid rows, and the function f.

Figure 9:
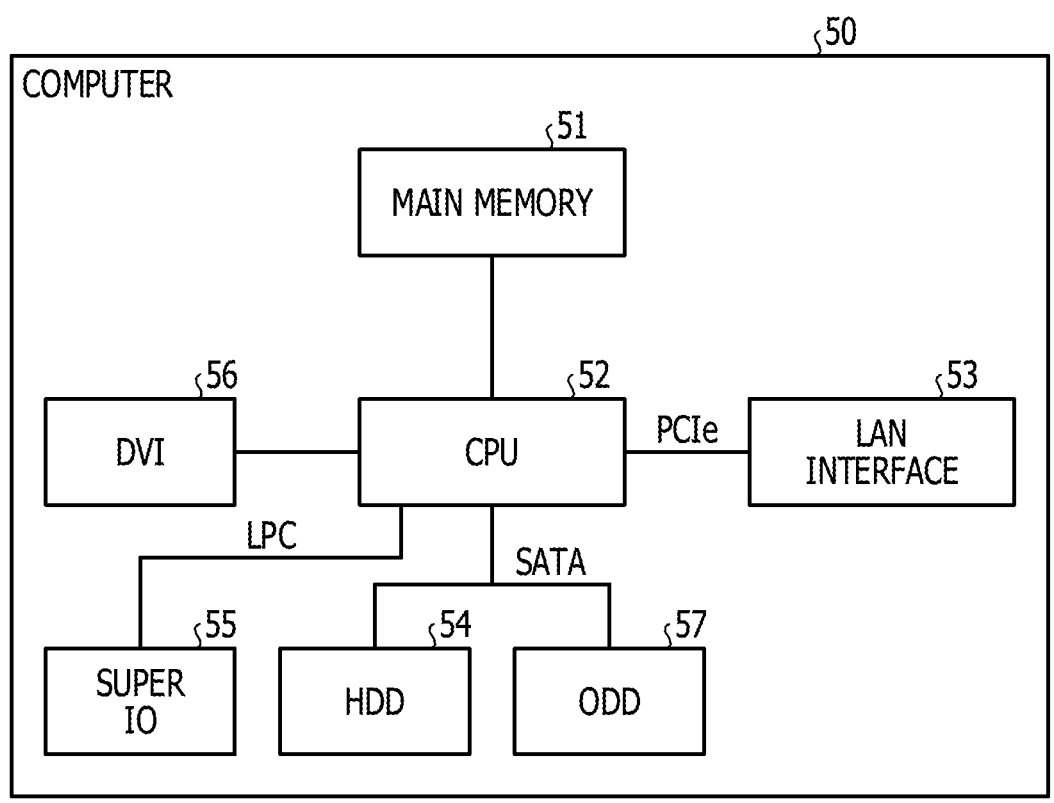
FIG. 9 is a block diagram illustrating a hardware configuration of a computer executing an RDBMS.

Next, a computer executing the RDBMS 1 will be described. FIG. 9 is a diagram illustrating a hardware configuration of a computer executing the RDBMS 1. As illustrated in FIG. 9, the computer 50 includes a main memory 51, a CPU 52, a local area network (LAN) interface 53, and a hard disc drive (HDD) 54. Further, the computer 50 includes a super IO 55, a digital visual interface (DVI) 56, and an optical disk drive (ODD) 57.

The main memory 51 is a memory that stores a program and a result obtained while the program is executed. The CPU 52 is a central processing unit that reads and executes the program from the main memory 51. The CPU 52 includes a chipset having a memory controller.

The LAN interface 53 is an interface for connecting the computer 50 to another computer via an LAN. The HDD 54 is a disk device that stores a program and data, and the super IO 55 is an interface for connecting an input device such as a mouse and a keyboard. The DVI 56 is an interface for connecting a liquid crystal display device, and the ODD 57 is a device that reads and writes a DVD.

The LAN interface 53 is connected to the CPU 52 through a PCI express (PCIe), and the HDD 54 and the ODD 57 are connected to the CPU 52 through a serial advanced technology attachment (SATA). The super IO 55 is connected to the CPU 52 through a low pin count (LPC).

Thus, the RDBMS 1 executed by the computer 50 is stored in the DVD, is read from the DVD by the ODD 57, and is installed in the computer 50. Otherwise, the RDBMS 1 is stored in a database of another computer system connected through the LAN interface 53, is read from the database, and is installed in the computer 50. Thus, the installed RDBMS 1 is stored in the HDD 54, is read in the main memory 51, and is executed by the CPU 52.

As described above, in the embodiment, the first determination unit 21 calculates the best size $EX_{Max}$ of the extent when there is no update by using the total number N of data, one-time MVCC cost (MVCCC), and one-time cost LROS for conversion to the local ROS 18*a*. Thus, the second determination unit 22 calculates the size of the extent using information on $EX_{max}$ and the deviation of the number of the valid rows. However, the RDBMS 1 may lower the MVCC cost.

Further, in the embodiment, the second determination unit 22 calculates the size of the extent using $EX_{max}$, the deviation $\sigma$ of the number of the valid rows, the maximum value $\sigma_{max}$ of the deviation $\sigma$ of the number of the valid rows, and the function f. However, the second determination unit 22 may reflect the deviation of the updating on the calculation of the size of the extent.

Further, in the embodiment, the second conversion unit 14*b* converts the whiteout WOS 13*b* to create the deletion vector 17, and the second determination unit 22 calculates the number of the valid rows of each extent using the deletion vector 17. However, the second determination unit 22 may efficiently perform the process of calculating the number of the valid rows of each extent.

Further, in the embodiment, the first conversion unit 14*a* converts only visible data from all existing transactions to update the ROS 15. However, the MVCC unit 18*b* may efficiently perform the MVCC.

A case where the WOS 13 has the data WOS 13*a* and the whiteout WOS 13*b* has been described in the embodiment, and the WOS 13 may have information on an operation on the original table 11 in another form.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus for calculating a size of a processing unit in a database management system, the database management system being configured to perform a reflection process that includes reflecting, per the processing unit, information on an operation performed in a row-type database to a column-type database, the apparatus comprising:
   a memory; and
   a processor coupled to the memory, the processor being configured to
   execute a first calculation process that includes calculating a processing unit reference value based on first information and second information, the first information indicating processing costs of multi-version concurrency control performed per the processing unit by the database management system, the second information indicating processing costs of a process of converting the information on the operation performed in the row-type database into a form of the column-type database after the reflection process is executed in a previous time, and
   execute a second calculation process that includes calculating the size of the processing unit based on the processing unit reference value calculated by the first calculation process and information on a deviation of the number of valid rows included in a plurality of processing units in the database management system.

2. The apparatus according to claim 1,
   wherein the second calculation process is configured to calculate the size of the processing unit, based on a ratio between the deviation and a maximum value of the deviation.

3. The apparatus according to claim 2,
   wherein the reflection process is configured to create a deletion vector indicating a deleted row in each processing unit, and
   wherein the second calculation process is configured to calculate the deviation using the deletion vector.

4. The apparatus according to claim 1,
   wherein the reflection process is configured to reflect visible data from all existing transactions on the column-type database.

5. A method for calculating a size of a processing unit in a database management system, the database management system being configured to perform a reflection process that includes reflecting, per the processing unit, information on an operation performed in a row-type database to a column-type database, the method comprising:
   executing a first calculation process that includes calculating a processing unit reference value based on first information and second information, the first information indicating processing costs of multi-version concurrency control performed per the processing unit by the database management system, the second information indicating processing costs of a process of converting the information on the operation performed in the row-type database into a form of the column-type database after the reflection process is executed in a previous time; and
   executing a second calculation process that includes calculating the size of the processing unit based on the processing unit reference value calculated by the first calculation process and information on a deviation of the number of valid rows included in a plurality of processing units in the database management system.

6. The method according to claim 5,
   wherein the second calculation process is configured to calculate the size of the processing unit, based on a ratio between the deviation and a maximum value of the deviation.

7. The method according to claim 6,
   wherein the reflection process is configured to create a deletion vector indicating a deleted row in each processing unit, and
   wherein the second calculation process is configured to calculate the deviation using the deletion vector.

8. The method according to claim 6,
   wherein the reflection process is configured to reflect visible data from all existing transactions on the column-type database.

9. A non-transitory computer-readable storage medium for storing a program which causes a processor to perform processing for calculating a size of a processing unit in a database management system, the database management system being configured to perform a reflection process that includes reflecting, per the processing unit, information on an operation performed in a row-type database to a column-type database, the processing comprising:
   executing a first calculation process that includes calculating a processing unit reference value based on first information and second information, the first information indicating processing costs of multi-version concurrency control performed per the processing unit by the database management system, the second information indicating processing costs of a process of converting the information on the operation performed in the row-type database into a form of the column-type database after the reflection process is executed in a previous time; and executing a second calculation process that includes calculating the size of the processing unit based on the processing unit reference value calculated by the first calculation process and information on a deviation of the number of valid rows included in a plurality of processing units in the database management system.

10. The non-transitory computer-readable storage medium according to claim 9,
wherein the second calculation process is configured to calculate the size of the processing unit, based on a ratio between the deviation and a maximum value of the deviation.

11. The non-transitory computer-readable storage medium according to claim 10,
wherein the reflection process is configured to create a deletion vector indicating a deleted row in each processing unit, and
wherein the second calculation process is configured to calculate the deviation using the deletion vector.

12. The non-transitory computer-readable storage medium according to claim 10,
wherein the reflection process is configured to reflect visible data from all existing transactions on the column-type database.

* * * * *